(12) United States Patent
Chen et al.

(10) Patent No.: US 7,813,241 B2
(45) Date of Patent: Oct. 12, 2010

(54) RECOVERY METHOD FOR RECORDING TO WRITE-ONCE DISC

(75) Inventors: Shih-Kuo Chen, Taoyuan County (TW); Chin-Fa Hsu, Taoyuan County (TW); Shiu-Ming Chu, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 480 days.

(21) Appl. No.: 11/870,414

(22) Filed: Oct. 10, 2007

(65) Prior Publication Data

US 2008/0130432 A1    Jun. 5, 2008

(30) Foreign Application Priority Data

Nov. 30, 2006    (TW) .............................. 95144622 A

(51) Int. Cl.
*G11B 7/00* (2006.01)
(52) U.S. Cl. ................. 369/53.12; 369/53.2; 369/44.33
(58) Field of Classification Search .............. 369/53.12, 369/53.2, 30.03
See application file for complete search history.

(56) References Cited

U.S. PATENT DOCUMENTS

| | | | | |
|---|---|---|---|---|
| 5,659,762 A | * | 8/1997 | Sawada et al. ............... | 713/323 |
| 5,715,355 A | * | 2/1998 | Yonemitsu et al. ............ | 386/95 |
| 6,463,022 B1 | * | 10/2002 | Ito et al. ................... | 369/53.24 |
| 6,876,612 B2 | * | 4/2005 | Yoneyama et al. ........ | 369/47.55 |
| 7,623,429 B2 | * | 11/2009 | Lin ........................... | 369/53.2 |
| 2003/0133386 A1 | * | 7/2003 | Hahn ....................... | 369/59.25 |
| 2004/0109393 A1 | * | 6/2004 | Hahn ........................ | 369/30.07 |
| 2004/0228239 A1 | * | 11/2004 | Okamoto ................. | 369/47.13 |
| 2005/0094501 A1 | * | 5/2005 | Tsai et al. ................ | 369/30.18 |
| 2005/0201213 A1 | * | 9/2005 | Sasaki ..................... | 369/30.08 |
| 2006/0280087 A1 | * | 12/2006 | Lai et al. ................. | 369/53.24 |

* cited by examiner

*Primary Examiner*—Wayne R Young
*Assistant Examiner*—Adam R Giesy
(74) *Attorney, Agent, or Firm*—Winston Hsu; Scott Margo; Min-Lee Teng

(57) ABSTRACT

A recovery method for recording to a write-once disc. The recovery method includes: sequentially reading data within a plurality of Data Control Blocks corresponding to respective sessions on the write-once disc; utilizing data included in the Data Control Blocks to establish address information corresponding to each closed session; determining whether the write-once disc is finalized or not according to existence of a lead-out zone; reading a TOC (table of content) block of a TOC area; utilizing the address information stored in a memory of an optical disc drive to recover the TOC block and then storing the TOC block into the memory of the optical disc drive as data of the TOC block prepared for the next recording operation when reading the TOC block fails and the write-once disc is not finalized; and completing the loading operation of the write-once disc to make the write-once disc enter a recordable status.

9 Claims, 3 Drawing Sheets

RECOVERY METHOD FOR RECORDING TO WRITE-ONCE DISC

BACKGROUND OF THE INVENTION

1. Field of the Invention

The present invention relates to recovering recording of an optical disc, and more particularly, to a method of recovering recording of a write-once disc by re-establishing a TOC (Table of Content) block of the write-once disc when failing to read the TOC block on the write-once disc.

2. Description of the Prior Art

A write-once disc is allowed of merely recording data once. As a result, deleting recorded data on the write-once disc and overwriting with new data is not feasible. For this reason, before the start of each recording operation, identifying the address of a closed session produced by a latest recording operation and the write-once disc being actually not finalized are performed to ensure that recording a new data session will not overwrite or damage the data already recorded on the write-once disc.

Please refer to FIG. 1. FIG. 1 is a flowchart illustrating a loading operation of the write-once disc according to the prior art. As shown in FIG. 1, in Step 1, an optical disc drive loads the write-once disc, and then reads data stored within a lead-in zone on the write-once disc to confirm the loaded optical disc is actually a write-once disc. In Step 2, the optical disc drive sequentially reads data within a plurality of Data Control Blocks corresponding to sessions on the write-once disc. In Step 3, the optical disc drive reads data within a TOC area of the lead-in zone on the write-once disc. If the reading operation of the TOC area is successful, the flow proceeds to Step 5; if the reading operation of the TOC area fails, the flow proceeds to Step 4. In Step 4, since the reading operation of the TOC area fails, the optical disc drive determines that the write-once disc is finalized and therefore recording of new data sessions is unfeasible. In Step 5, the optical disc drive further checks the position and the status of the closed session produced by the latest recording operation through a latest recorded data within the TOC area, thereby preparing recording for the next session or setting the write-once disc to be finalized. In Step 6, the optical disc drive further reads other data within the lead-in zone. Finally, in Step 7, the flow of loading the write-once disc is completed.

Conventionally, a recording process of the write-once disc takes a data content of the TOC area within the lead-in zone of the write-once disc as a prerequisite for performing the recording operation of the write-once disc. When the conventional optical disc drive loads the write-once disc to proceed with recording operations, recording to the write-once disc will be unfeasible for the reason that as the optical disc drive is short of the latest recorded data within the TOC area. The optical disc drive therefore cannot check the position of the closed session produced by the latest recording and cannot determine whether the write-once disc is finalized if the data within the TOC area is damaged or the write-once disc is scratched. Waste of the recording space on the disc will occur in such a situation because, even though there is recordable space on the write-once disc, the optical disc drive will not record any new data onto the write-once disc. Therefore, in a situation where data contents of the TOC area cannot be read to make continuous recording feasible, waste of disc space will occur.

SUMMARY OF THE INVENTION

It is therefore one of the objectives of the present invention to provide a recovery method for recording an optical disc by reading control data of each session on the optical disc to recover data within a TOC block of a TOC area on the optical disc, and storing the data into a memory of an optical disc drive, thereby recovering the optical disc to recordable status.

To achieve the aforementioned objective according to the present invention, the disclosed recovery method for recording an optical disc includes the following steps. First, sequentially read data within a plurality of Data Control Blocks corresponding to respective sessions on the write-once disc when an optical disc drive loads the write-once disc, and address information within the Data Control Blocks is utilized to establish address information corresponding to a closed session. Second, the disc drive determines whether a lead-out zone exists on the write-once disc to indicate whether the write-once disc is finalized or un-finalized. Then the optical disc drive reads a TOC block of a TOC area within a lead-in zone on the write-once disc. When the above reading operation of the TOC block fails and the write-once disc has been checked from the previous steps as un-finalized, the optical disc drive utilizes the address information corresponding to each session stored in a memory of the optical disc drive to recover the TOC block and stores the TOC block into the memory of the optical disc drive as data of the TOC block during recording. If the above reading operation of the TOC block succeeds or the write-once disc is finalized, at this time the optical disc drive does not have to recover the TOC block of the TOC area and continuously reads other data of the lead-in zone to complete the loading flow of the write-once disc.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
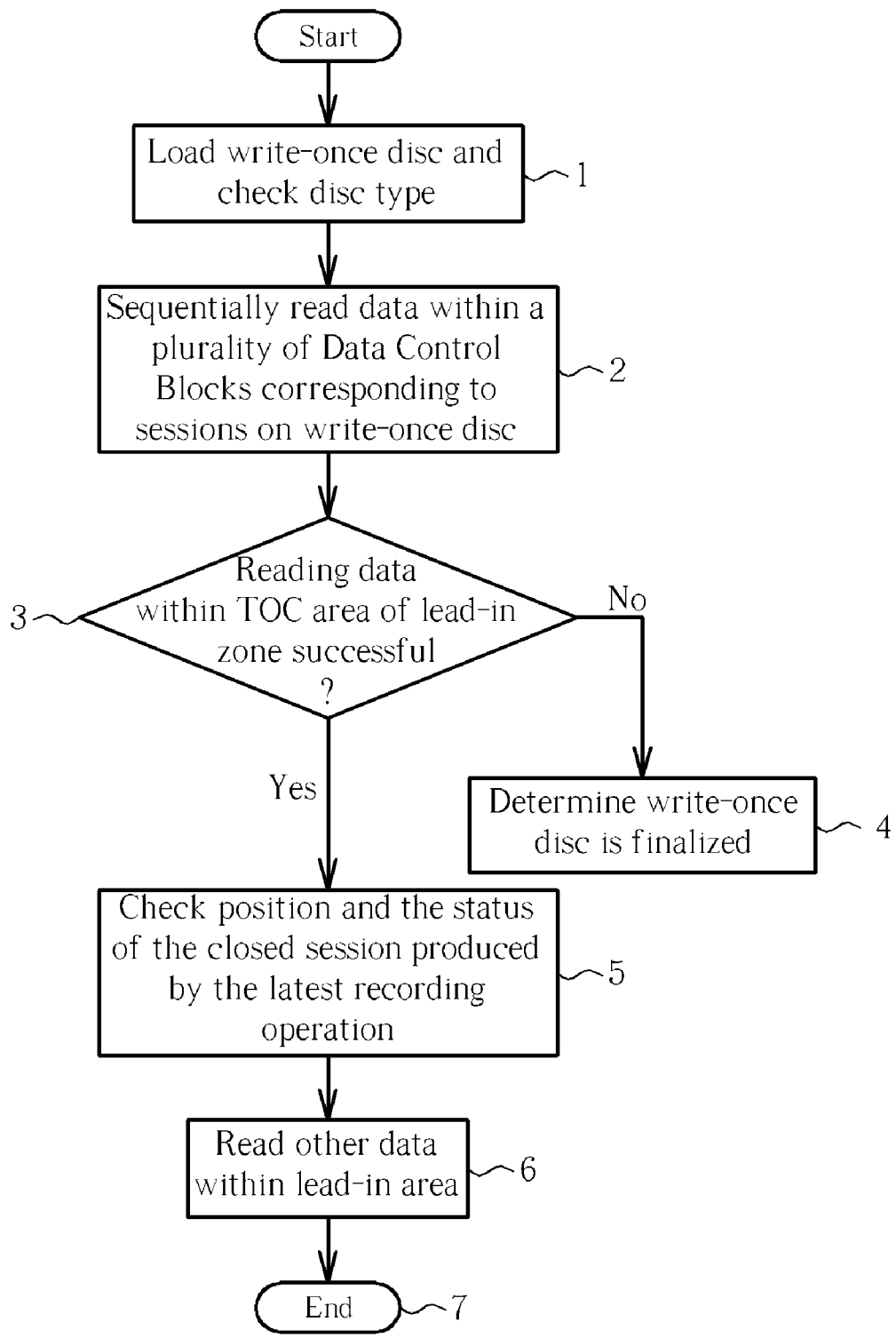
FIG. 1 is a flowchart illustrating a loading operation of a prior art write-once disc.
Figure 2:
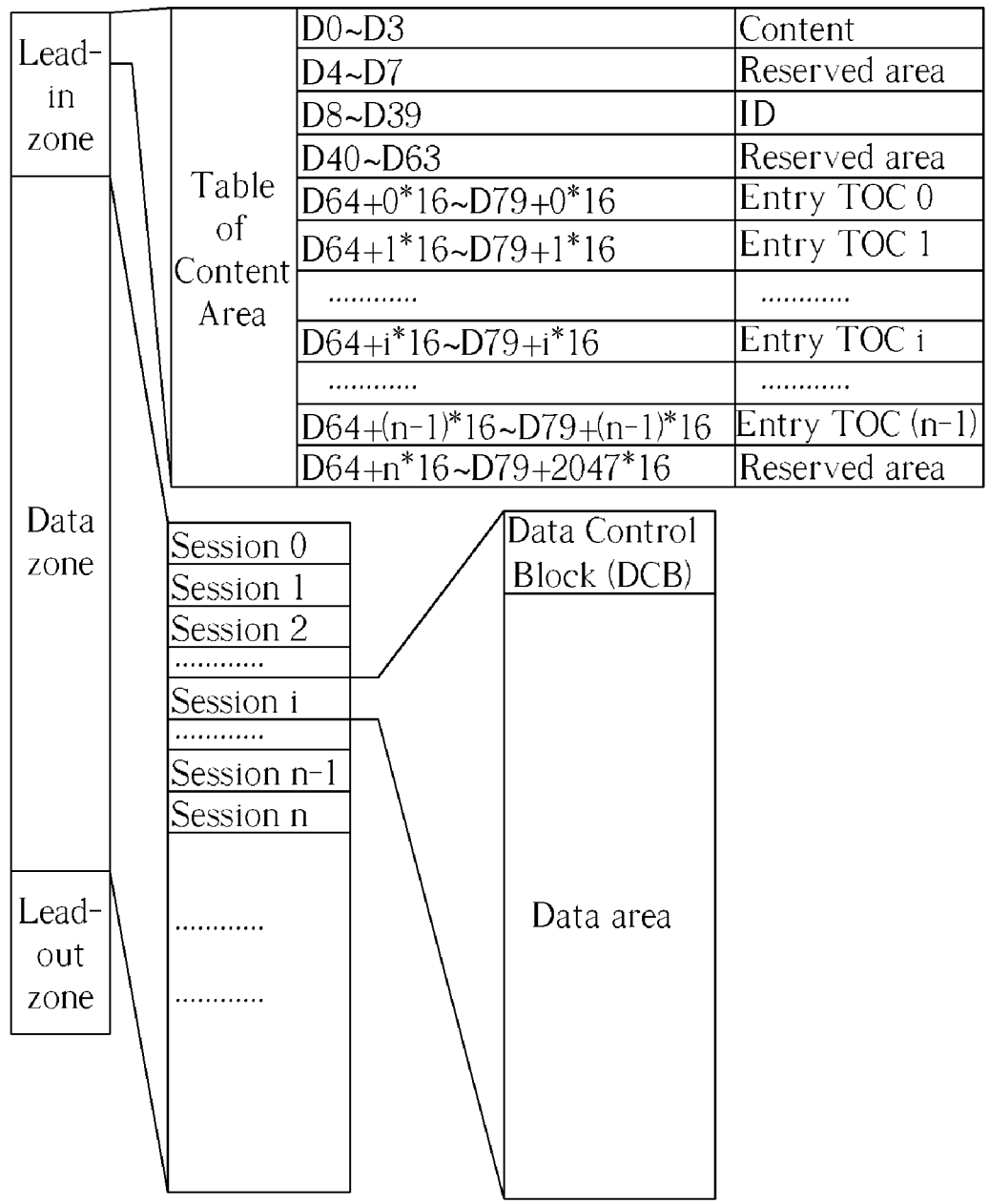
FIG. 2 is a diagram illustrating a data structure corresponding to a write-once disc.

Please refer to FIG. 2. FIG. 2 is a diagram illustrating a data structure corresponding to a write-once disc. Taking a DVD+R/R DL (i.e. single layer DVD+R or dual layer DVD+R) disc as an example, a data structure of the DVD+R/R DL disc from an inner track to an outer track of the disc includes a lead-in zone, a data zone, and a lead-out zone, etc. The lead-in zone of the write-once disc provides information of disc status. The data zone is implemented as a storage area for practical user data and allows sequential recording operations, wherein each recording operation forms a data session and results in multi-session status on the write-once disc. When there is no space available for recording or the recording of the write-once disc ends, a lead-out zone is formed to act as a mark for final recording to avoid recording new data onto the finalized write-once disc.

To identify a position of a closed session produced by the latest recording operation, a control data area is configured in front of the data zone in each session mark, that is, behind the Data Control Block is actually used for storing recorded data. Additionally, in each session on the write-once disc, a closure area is located after the position of recorded data. The Data Control Block generally stores address information corresponding to a closed session at the $248^{th}$-$255^{th}$ byte of the Data Control Block. At the same time, a TOC (Table of Content) area is set in the lead-in area of the write-once disc. In addition to content data, the TOC area is mainly used for preserving 2048 reserved areas each having 16 bytes to serve as storage space. The reserved areas record an update data of a closed session directly after the latest position in the TOC area, thereby forming a newest TOC block of the TOC area. For example, if the write-once disc has been recorded N times previously, the TOC block of the TOC area will be in a sequence from entry TOC 0 to entry TOC N−1. In this embodiment of the present invention, if an N+1 time of recording is demanded, information corresponding to a newest closed session is formed at a reserve area of the entry TOC N of the TOC area within the lead-in area. When the optical disc drive loads the write-once disc in order to proceed with the recording operation, the optical disc drive has to read data of the latest TOC block first to check the position of the latest closed session on the write-once disc and the status of the sessions on the write-once disc in order to identify whether the write-once disc is at recordable status and whether to prepare for continuous recording of the next session.

The disclosed recovery method for recording an optical disc sequentially reads the Data Control Blocks corresponding to respective sessions on the write-once disc when the write-once disc is loaded, and utilizes the data stored at the $248^{th}$-$255^{th}$ bytes within each Data Control Block to establish address information corresponding to closed sessions respectively. The optical disc drive then checks whether a lead-out zone exists after the final closed zone of the recording session on the write-once disc. When the lead-out zone exists, the write-once disc is finalized; otherwise, the write-once disc is not finalized and therefore allows further data recordings. The optical disc drive further reads the TOC block within the TOC area on the write-once disc. If the reading operation fails, the latest data within the TOC block cannot be obtained for identifying the position and the status of the closed session produced by the latest recording operation. If the status of the write-once disc obtained from the previous step indicates that the loaded write-once disc is a non-finalized disc, the optical disc drive recovers the data within the TOC block according to address information corresponding to respective sessions obtained in a precious step and stored in a memory of the optical disc drive. The established TOC block is then stored into the memory of the optical disc drive as data of the TOC block prepared for the next recording operation. On the other hand, if the optical disc drive successfully reads the data within the TOC block or the optical disc is finalized already, at this time, recovering the data within the TOC block is not required. By using the disclosed recovery method of the present invention, even if the TOC area within the lead-in zone is damaged or the write-once disc is scratched, the optical disc drive is still capable of recovering the write-once disc to recordable status again by utilizing data of the re-established TOC block stored in the memory of the optical disc drive.

Figure 3:
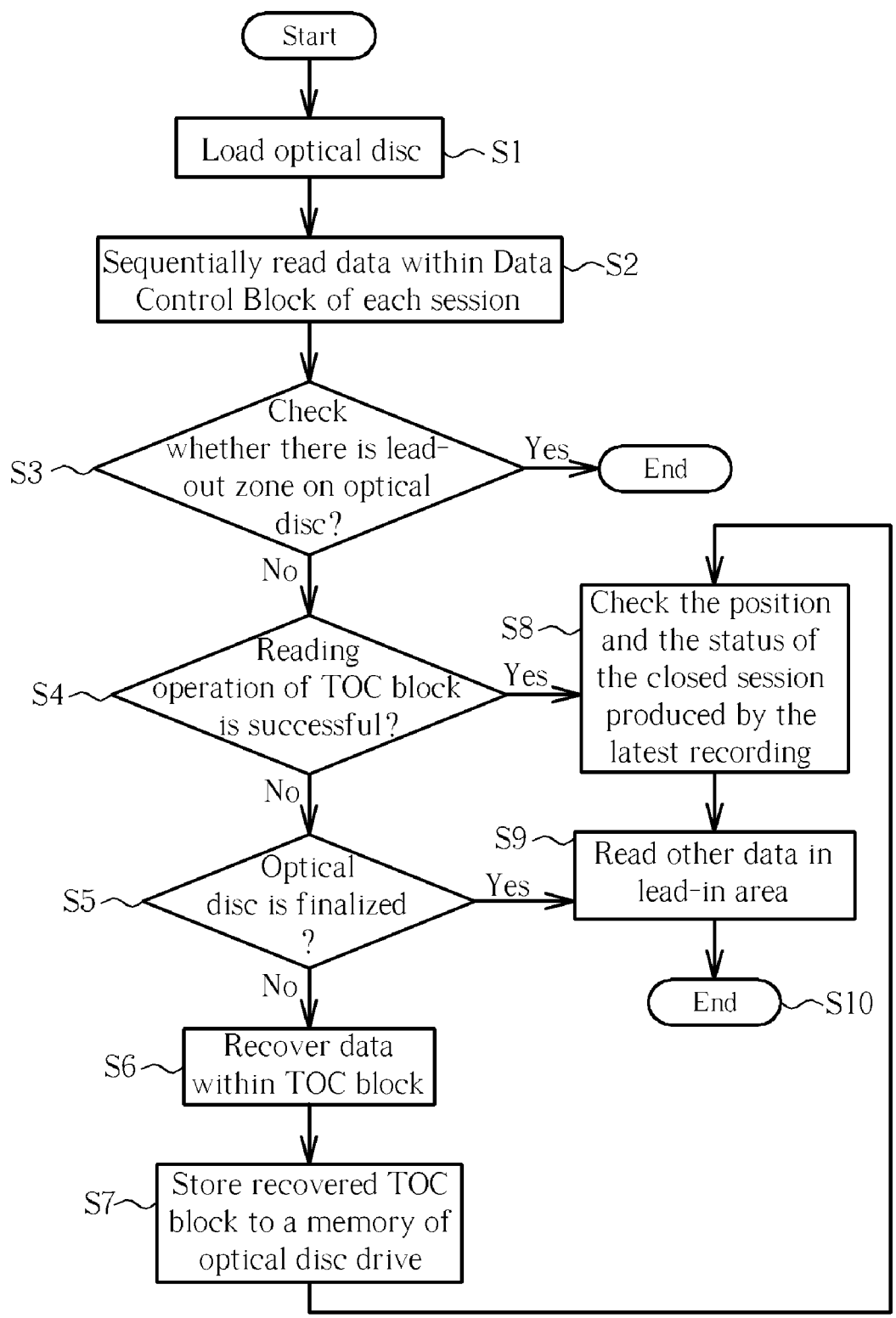
FIG. 3 is a flowchart of a recovery method for recording an optical disc according to an embodiment of the present invention.

In accordance with the aforementioned technical features of the present invention, please refer to FIG. 3, which is a flowchart of the recovery method for recording a disc according to an embodiment of the present invention. The detailed steps are as follows:

Step S1: Load an optical disc into an optical disc drive.

Step S2: The optical disc drive sequentially reads data within a Data Control Block of each session.

Step S3: Check whether there is a lead-out zone on the optical disc. If there is none, the optical disc is not finalized yet and is capable of recording new data. If yes, the optical disc is finalized and recording new data on the finalized optical disc is not allowed.

Step S4: Read a TOC block within a lead-in zone on the optical disc and determine whether the reading operation of the TOC block on the optical disc is successful. If yes, go to Step 8; otherwise, go to Step 5.

Step S5: Check if the optical disc is finalized or not according to the existence of the lead-out zone obtained in Step 3. If yes, go to Step 9. If no, go to Step 6.

Step S6: Recover data within the TOC block according to the data within each Data Control Block of each session obtained in above Step 2.

Step S7: Stores the recovered TOC block to a memory of the optical disc drive to act as data of the TOC area prepared for next recording.

Step S8: Check the position and the status of the closed session produced by the latest recording or check the remaining space available for data recording on the optical disc to prepare for the next recording.

Step S9: Keep reading other data in the lead-in area, such as a Data Control Block (DCB), etc.

Step S10: The loading flow is completed and the optical disc drive is ready for accepting a user command to proceed with reading or recording operations.

From the aforementioned steps, the disclosed recovery method for recording an optical disc is capable of sequentially reading the Data Control blocks corresponding to respective sessions on the write-once disc to obtain address information of each session on the write-once disc for recovering the data of the TOC block when the reading operation of TOC block within the lead-in zone on the write-once disc fails. In this case, the write-once disc is judged as not finalized due to no lead-out zone being formed on the write-once disc. Besides, In a case where the TOC block within the TOC area of the lead-in zone is damaged or the write-once disc is scratched, the recovered TOC block is stored into the memory of the optical disc drive as a replacement of the original TOC block within the TOC area of the lead-in zone on the write-once disc. Therefore the damaged write-once disc is recovered to recordable status again and allows recording to avoid wasting storage space on the write-once disc.

Those skilled in the art will readily observe that numerous modifications and alterations of the device and method may be made while retaining the teachings of the invention.

What is claimed is:

1. A recovery method for recording an optical disc, comprising following steps:
    (a) reading data within Data Control Blocks corresponding to respective sessions on the optical disc, and checking whether the optical disc is finalized or not;
    (b) reading a Table of Contents (TOC) block within a lead-in zone on the optical disc, when reading the TOC block succeeds, going to Step (e), and when reading the TOC block fails, proceeding with Step (e) if the optical disc is checked to be finalized, and proceeding with Step (c) if the optical disc is checked to be non-finalized;

(c) recovering the TOC block to generate a recovered TOC block;
(d) storing the recovered TOC block; and
(e) ending a loading operation of the optical disc;
wherein Step (b) checking whether the optical disc is finalized or not by directly utilizing information obtained from checking whether the optical disc is finalized or not in Step (a).

2. The method of claim 1, wherein Step (a) checking whether the optical disc is finalized or not is to check existence of a lead-out zone on the optical disc.

3. The method of claim 1, wherein reading data within Data Control Blocks corresponding to respective sessions on the optical disc in Step (a) comprises reading address information of the Data Control Blocks corresponding to closed sessions on the optical disc.

4. The method of claim 3, wherein each session is located in a data zone on the optical disc.

5. The method of claim 3, wherein recovering the TOC block in Step (c) comprises utilizing the address information obtained in Step (a) to recover the TOC block.

6. The method of claim 1, wherein Step (b) is to read the TOC block within a TOC area on the optical disc.

7. The method of claim 1, wherein Step (d) further comprises storing the recovered TOC block into a memory.

8. The method of claim 7, wherein the memory is in an optical disc drive.

9. The method of claim 1, wherein the optical disc is a DVD+R/R DL disc.

* * * * *